United States Patent
Abdallah et al.

(10) Patent No.: US 10,741,911 B2
(45) Date of Patent: *Aug. 11, 2020

(54) TRAINING METHOD AND SYSTEM FOR DIRECTIONAL TRANSMISSION IN WIRELESS COMMUNICATION

(71) Applicant: SONY CORPORATION, Tokyo (JP)

(72) Inventors: Ramy Medhat Abdallah, San Jose, CA (US); Kazuyuki Sakoda, Campbell, CA (US)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/595,925

(22) Filed: Oct. 8, 2019

(65) Prior Publication Data

US 2020/0044337 A1 Feb. 6, 2020

Related U.S. Application Data

(63) Continuation of application No. 15/175,615, filed on Jun. 7, 2016, now Pat. No. 10,490,895.

(51) Int. Cl.
*H04B 1/00* (2006.01)
*H04B 7/00* (2006.01)
(Continued)

(52) U.S. Cl.
CPC ............. *H01Q 3/34* (2013.01); *H04B 7/0617* (2013.01); *H04B 7/0695* (2013.01); *H04B 7/088* (2013.01);
(Continued)

(58) Field of Classification Search
CPC .... H04B 7/0695; H04B 7/088; H04B 7/0617; H04B 7/0417; H04B 7/0408;
(Continued)

(56) References Cited

U.S. PATENT DOCUMENTS 8,422,961 B2 4/2013 Kafle
8,477,813 B2* 7/2013 Zhang ............... H04L 25/03343
370/510

(Continued)

FOREIGN PATENT DOCUMENTS

WO 2014/124048 A1 8/2014
WO 2015069090 A1 5/2015

OTHER PUBLICATIONS

European Patent Office (EPO), International Search Report and Written Opinion dated Aug. 24, 2017, related PCT international application No. PCT/US2017/034632, pp. 1-17, with claims searched, pp. 18-22.

(Continued)

*Primary Examiner* — Nhan T Le
(74) *Attorney, Agent, or Firm* — O'Banion & Ritchey LLP; John P. O'Banion

(57) ABSTRACT

A wireless radio communication apparatus and method in which directional transmission, also known as beamforming, training is performed on transmissions between multiple wireless radio communication devices participating in a local network. A sector level sweep (SLS) process uses transmitter sector sweep (TXSS) training, which includes transmitting a sector sweep (SSW) followed by generating sector sweep (SSW) feedback to other nodes in the local network, with optimum transmit sector information being exchanged between nodes. Embodiments include a power save mode, a delayed SSW feedback mode, and an embedded polling and feedback mode.

22 Claims, 16 Drawing Sheets

(51) Int. Cl.
*H01Q 3/34* (2006.01)
*H04B 7/08* (2006.01)
*H04B 7/06* (2006.01)

(52) U.S. Cl.
CPC ............ *Y02D 70/14* (2018.01); *Y02D 70/142* (2018.01); *Y02D 70/22* (2018.01); *Y02D 70/444* (2018.01)

(58) Field of Classification Search
CPC ........ H04B 7/0421; H01Q 3/34; Y02D 70/14; Y02D 70/142; Y02D 70/22; Y02D 70/444
See application file for complete search history.

(56) References Cited

U.S. PATENT DOCUMENTS

| | | | | |
|---|---|---|---|---|
| 8,509,130 | B2* | 8/2013 | Liu | H04B 7/0695 342/367 |
| 9,094,071 | B2 | 7/2015 | Nandagopalan | |
| 9,225,401 | B2* | 12/2015 | Wang | H04B 7/0695 |
| 10,305,550 | B2* | 5/2019 | Wang | H04W 72/1284 |
| 10,490,895 | B2* | 11/2019 | Abdallah | H04B 7/088 |
| 2013/0044695 | A1 | 2/2013 | Xu et al. | |
| 2015/0071185 | A1 | 3/2015 | Trainin | |
| 2015/0208439 | A1 | 7/2015 | Cheong et al. | |
| 2015/0244432 | A1 | 8/2015 | Wang | |
| 2016/0044711 | A1 | 2/2016 | Lou et al. | |
| 2016/0119043 | A1 | 4/2016 | Rajagopal et al. | |
| 2016/0255660 | A1 | 9/2016 | Son et al. | |
| 2016/0323755 | A1 | 11/2016 | Cordeiro et al. | |
| 2016/0380685 | A1 | 12/2016 | Kasher et al. | |
| 2017/0079031 | A1 | 3/2017 | Maltsev, Jr. et al. | |
| 2017/0085306 | A1 | 3/2017 | Cariou et al. | |
| 2018/0123665 | A1 | 5/2018 | Oh et al. | |
| 2018/0159608 | A1 | 6/2018 | Leng et al. | |
| 2018/0262255 | A1 | 9/2018 | Lee et al. | |

OTHER PUBLICATIONS

European Patent Office (EPO), Office Action dated Sep. 3, 2019, related European patent application No. EP 17 729 291.9, pp. 1-8, claims examined, pp. 9-12.

Wang, James et al., "11ay DL MU-MIMO BF Training and User Selection", doc.: IEEE 802.11-16/0405r1, Mar. 13, 2016, 17 pages.

Korean Intellectual Property Office (KIPO), Notice of Preliminary Rejection dated Feb. 11, 2020, related Korean patent application No. 10-2018-7035124, Korean-language document, pp. 1-5, English-language translation, pp. 6-8, claims examined, pp. 9-13.

* cited by examiner

| Frame control | Duration | RA | TA | SSW feedback | BRP request | Beamformed link maintenance | FCS |
|---|---|---|---|---|---|---|---|
| 2 | 2 | 6 | 6 | 3 | 4 | 1 | 4 |

Octets:

| IE ID | Length | STAs ID | Timing offsets | Usage |
|---|---|---|---|---|

| Frame control | Duration | RA | TA | SLS-P IE | FCS |
|---|---|---|---|---|---|

FIG. 15

| Frame control | Duration | RA | TA | SSW | FCS |
|---|---|---|---|---|---|

FIG. 16A

| Frame control | Duration | RA | TA | SSW feedback 1 | SSW feedback 2 | ... | SSW feedback N | FCS |
|---|---|---|---|---|---|---|---|---|

FIG. 16B

| STA ID | Sector select | Antenna select | SNR report |
|---|---|---|---|

FIG. 17

| Frame control | Duration | RA | TA | SLS-P IE | SSW | FCS |

FIG. 24A

| Frame control | Duration | RA | TA | SSW | SSW feedback 1 | SSW feedback 2 | ••• | SSW feedback N | FCS |

FIG. 24B

TRAINING METHOD AND SYSTEM FOR DIRECTIONAL TRANSMISSION IN WIRELESS COMMUNICATION

CROSS-REFERENCE TO RELATED APPLICATIONS

This application is a continuation of U.S. patent application Ser. No. 15/175,615 filed on Jun. 7, 2016, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless network communication, and more particularly to Transmit sector sweep (TXSS) training for a group SLS.

2. Background Discussion

Highly directional communications, in particular those using beamforming techniques, are often necessary for overcoming poor link budgets in wireless communications, such as at mmWave frequencies.

Creating robust networks for wireless communication networks necessitates periodic beamforming training to account for link blockage, movement of nodes or surrounding, and similar impediments.

Figure 1A:
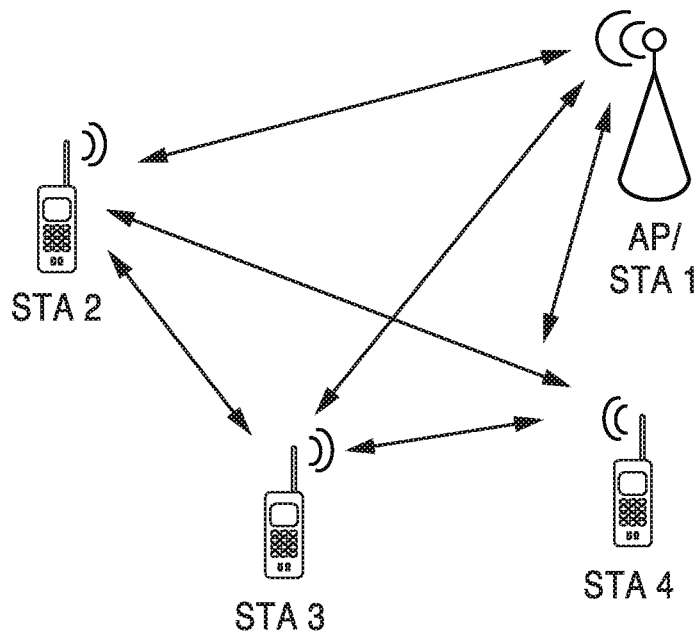
FIG. 1A depicts an example network having four nodes, with an access point (AP) as the first station (STA 1) shown along with additional stations, STA 2, STA 3 and STA 4.

If multiple stations (STAs) in the network are communicating to the AP or to each other in a peer-to-peer (P2P) mode, the BF training becomes highly inefficient. The BF training of these STAs may be performed in multiple phases and can span a number of super-frames, and consume a substantial portion of the communications air-time. Thus, although beamforming improves coverage and link quality, it incurs significant overhead during training.

Accordingly, a need exists for enhanced beamforming training which reduces required communications overhead. The present disclosure fulfills that need, while providing additional wireless networking benefits.

BRIEF SUMMARY

An apparatus and method are described with enhanced beamforming training for use in wireless communication systems. The disclosed apparatus provides coordination of transmit sector sweep (TXSS) training, as signaled by a master station (STA), such as an access point (AP) or other station, within a given local network. Mutual TXSS are performed between a group of STAs, in which every STA hears (receives) the sector sweep (SSW) frames of other STAs and utilizes this for mutual TXSS training. In addition, STAs may learn the TXSS training outcome/results, such as optimum transmit sector, of every link in the network of STAs participating in the TXSS, by receiving the SSW Feedback from all STAs. In at least one embodiment, the system is configured to use sleep/awake signaling for TXSS power save mode. In other embodiments variations are described using delayed SSW feedback, or embedded polling and feedback. The present disclosure can thus provide an enhanced wireless experience, such as when using millimeter-wave (mmWave) wireless local area networks (WLANs).

A number of terms are utilized in the disclosure whose meanings are generally utilized as described below.

AID: Association Identifier is utilized whenever a station associates to an AP (master station or central radio coordinator or other initiator), the station receives an AID. This AID is used to keep track of the stations that are associated and the members of the basic service set (BSS).

AP: Access Point is an entity that contains one station (STA) and provides access to distribution services, via the wireless medium (WM) for associated STAs.

AoA (AoD): Angle of Arrival (Angle of Departure) in which the direction of propagation of a radio-frequency wave incident (transmitted) on (from) an antenna array.

A-BFT: Association-Beam Forming Training period is a period announced in the beacons that is used for association and BF training of new stations joining the network.

Beamforming (BF) is a process of phasing antennas within an array to achieve directional transmission (form a beam) that does not use an omnidirectional antenna pattern or quasi-omni antenna pattern. It is used at a transmitter to improve the received signal power or signal-to-noise ratio (SNR) at an intended receiver.

Beam combining is a method of combining power contained in various beams at the receiver for each independent data stream.

BSS: Basic Service Set is a set of stations (STAs) that have successfully synchronized with an AP in the network.

BI: Beacon Interval is a cyclic superframe period that represents the time between beacon transmission times.

BRP: BF Refinement Protocol enables receiver training and iteratively trains the transmitter and receiver sides to achieve the best possible (optimum) directional communications.

CBAP: Contention-Based Access Period is a time period within the data transfer interval (DTI) of a directional multi-gigabit (DMG) BSS where contention-based enhanced distributed channel access (EDCA) is used.

DTI: Data Transfer Interval is the period whereby full BF training is permitted followed by actual data transfer. It can include one or more service periods (SPs) and contention-based access periods (CBAPs).

ISS: Initiator Sector Sweep.

MAC address: Medium Access Control (MAC) address.

MCS: Modulation and Coding Scheme is an index that can be translated into the PHY layer data rate.

Omni directional: is a non-directional antenna mode of transmission.

Quasi-omni directional: is a directional multi-gigabit (DMG) antenna operating mode with the widest beamwidth attainable.

Receive Sector Sweep: Reception of Sector Sweep (SSW) frames from different directional sectors, in which a sweep is performed between consecutive receptions.

Sector-level sweep (SLS) phase: A BF training phase that can include as many as four components: (i) an initiator sector sweep (ISS) to train the initiator, (ii) a responder sector sweep (RSS) to train the responder link, (iii) SSW Feedback, and (iv) an SSW ACK.

RSSI: Receive Signal Strength Indicator (in dBm) is a measure of signal strength.

SP: Service Period is scheduled by the access point (AP). Scheduled SPs start at fixed intervals of time.

STA: Station is a logical entity that is a singly addressable instance of a medium access control (MAC) and physical layer (PHY) interface to the wireless medium (WM).

Sweep: A sequence of transmissions, separated by a short beamforming interframe space (SBIFS) interval, in which the antenna configuration at the transmitter or receiver is changed between transmissions.

Transmit sector sweep (TXSS): Transmission of multiple Sector Sweep (SSW) or Directional Multi-gigabit (DMG) Beacon frames via different sectors, in which a sweep is performed between consecutive transmissions.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 1A is a radio node diagram showing communication between an access point (AP) and three other stations (STAs).

Figure 1B:
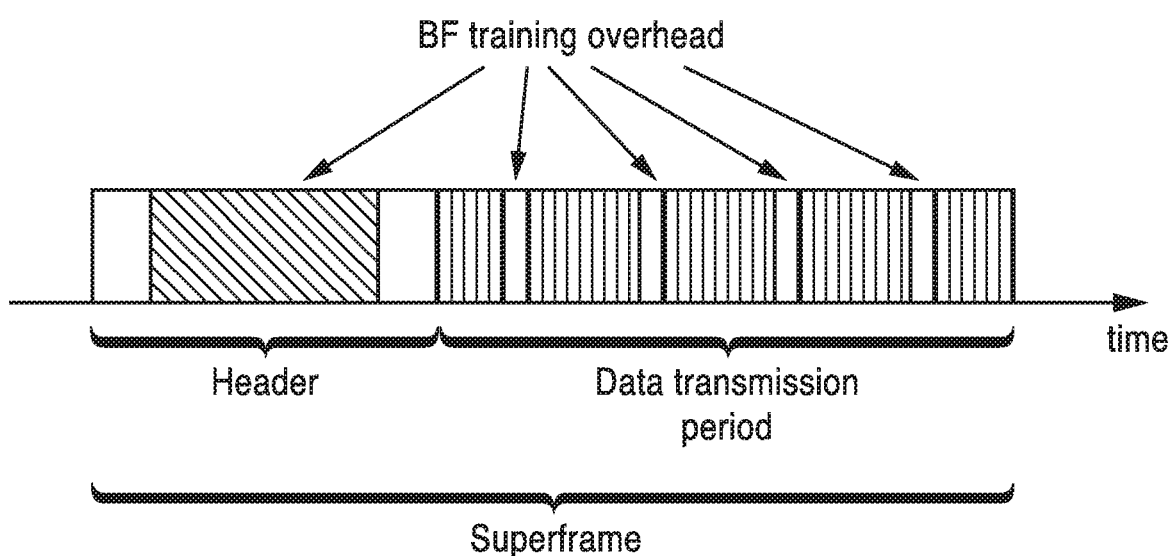
FIG. 1B depicts a superframe, with its header section and data transmission period marked, and depicting the sections of this superframe which are required for beamforming (BF) training, and thus comprise a BF training overhead.

FIG. 1B is a data field format of beamforming (BF) training overhead within the header and data transmission periods of a superframe.

Figure 2:
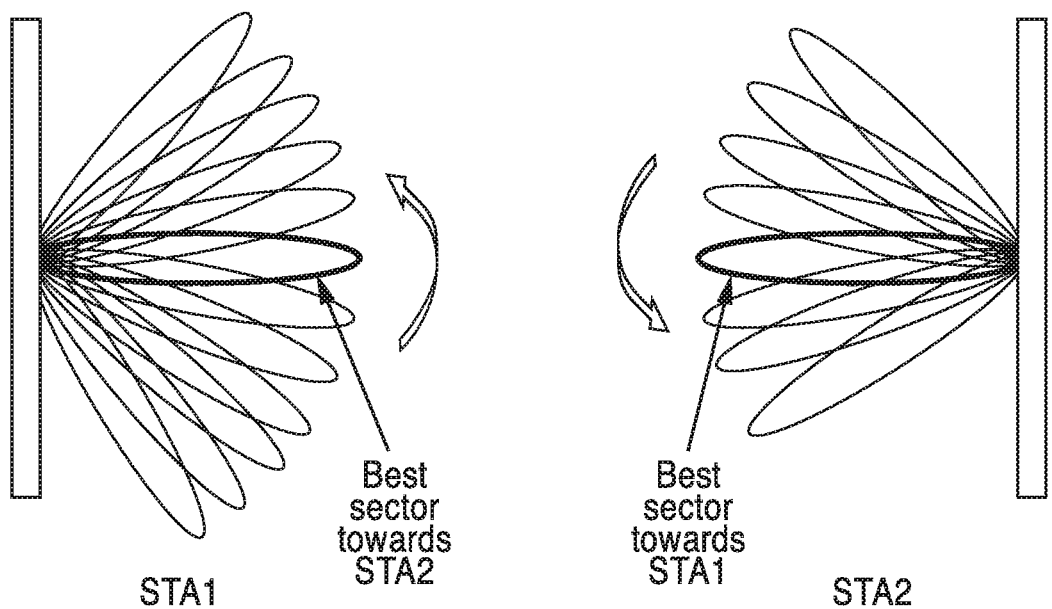

FIG. 2 is a beam pattern diagram showing best beam pattern sectors between two stations.

Figure 3:
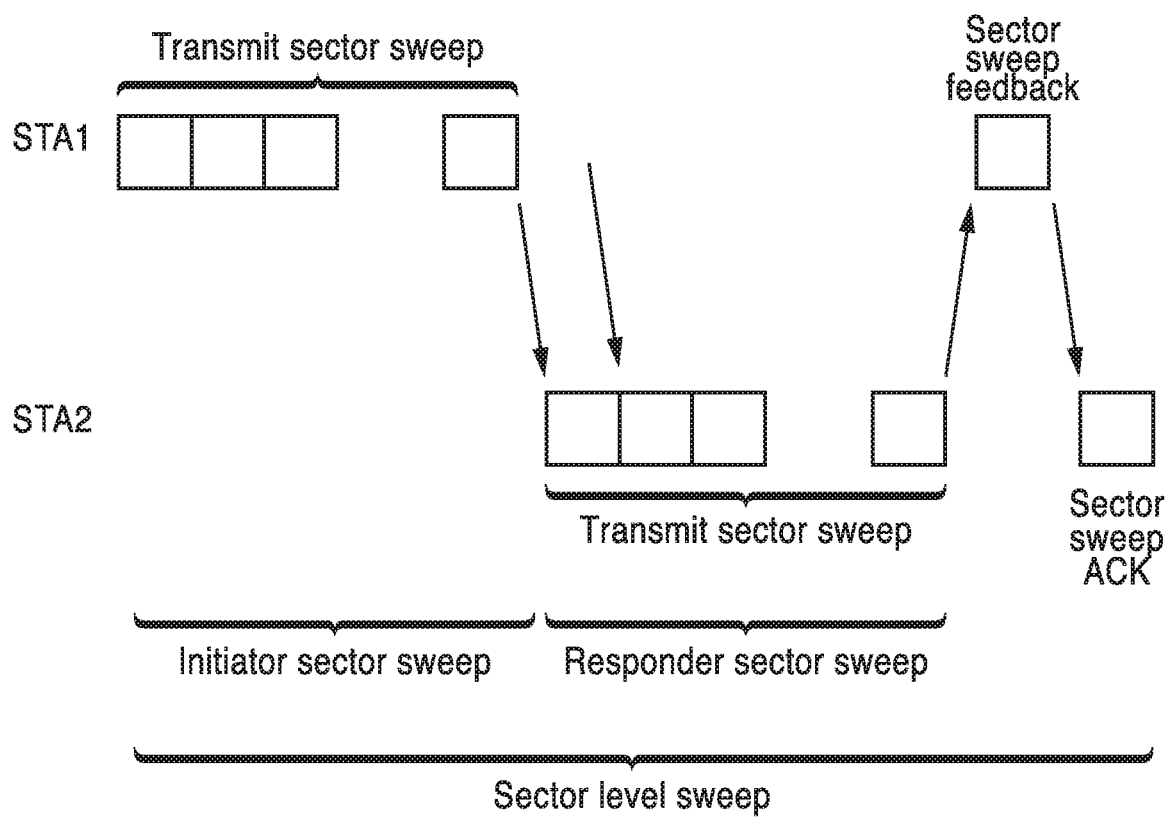

FIG. 3 is an air time diagram of sector level sweeping (SLS) between a transmitter and responder.

Figure 4:
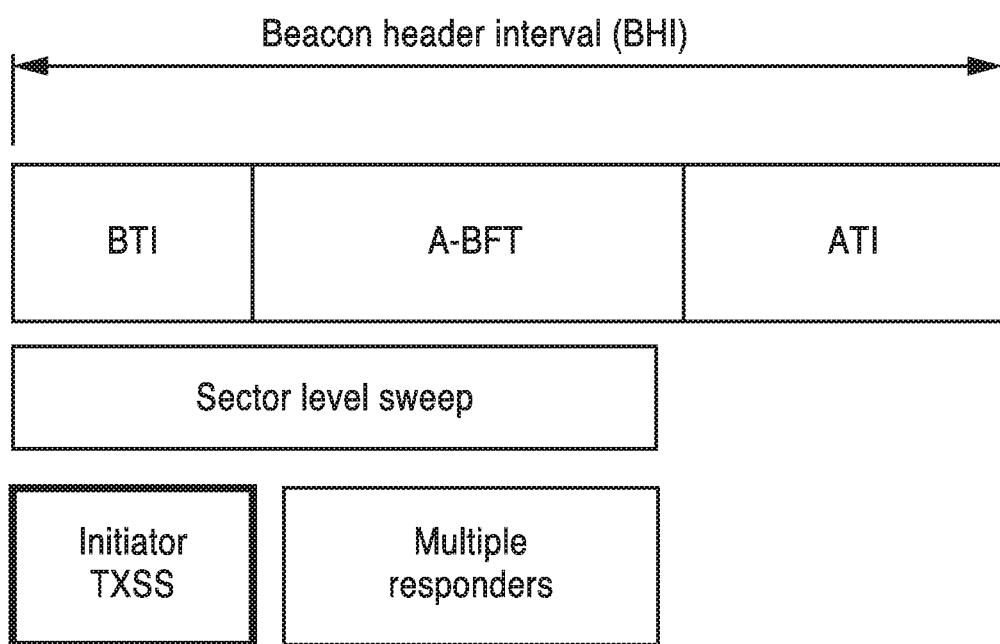

FIG. 4 is a air-time diagram of a beacon header interval (BHI) in which initiator and multiple responder TXSS are performed within the superframe header.

Figure 5:
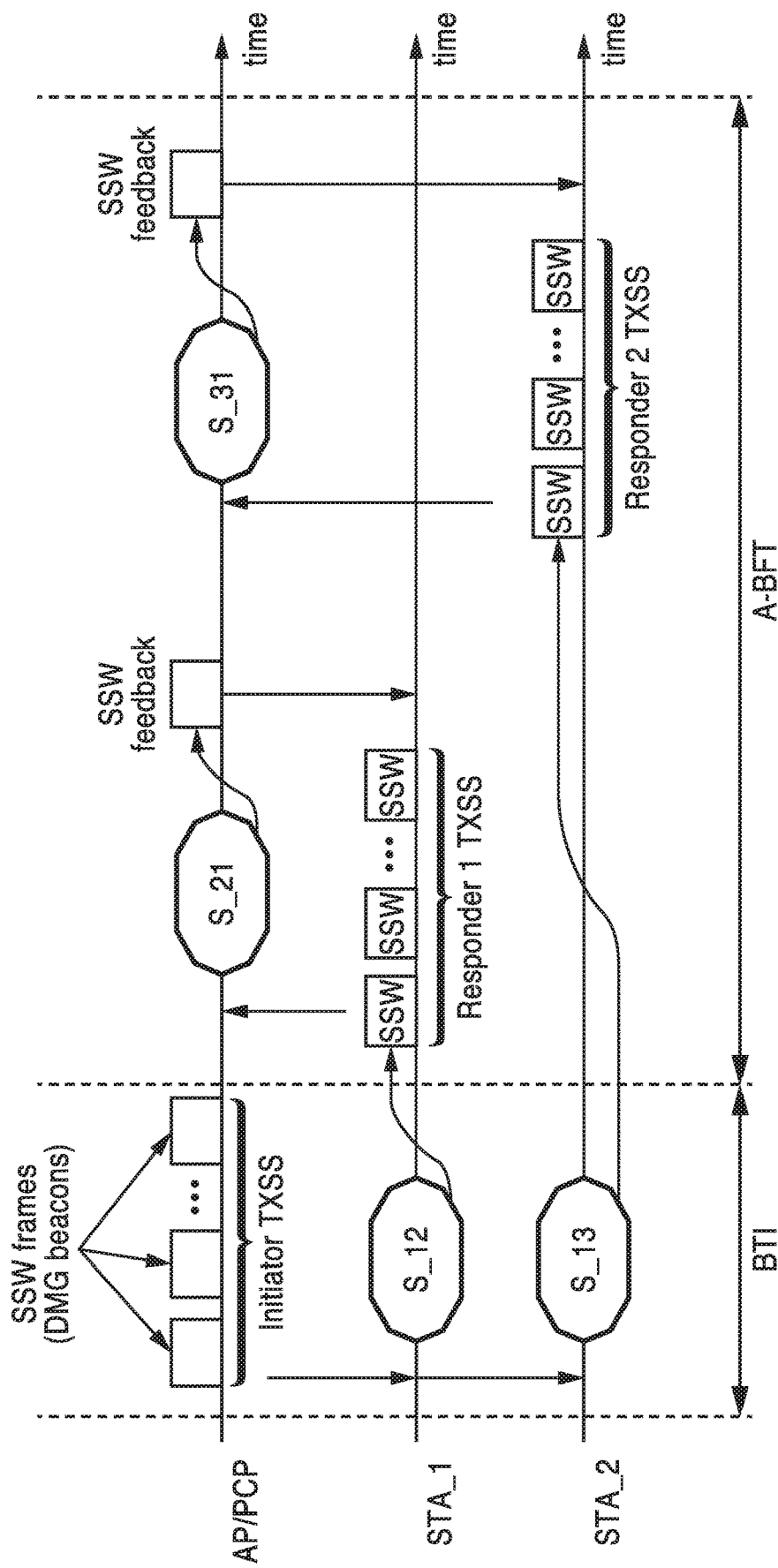

FIG. 5 is a message sequence of SLS BF training between AP and multiple STAs, in the 802.11ad standard.

Figure 6:

FIG. 6 is an air time diagram showing possible contention between responding STAs during the A-BFT period.

Figure 7:
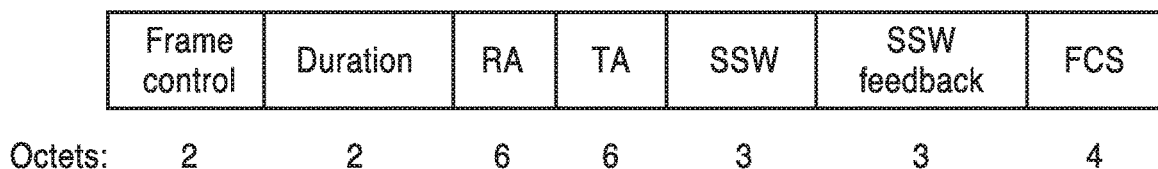

FIG. 7 is a data field format of the SSW control frame.

Figure 8:
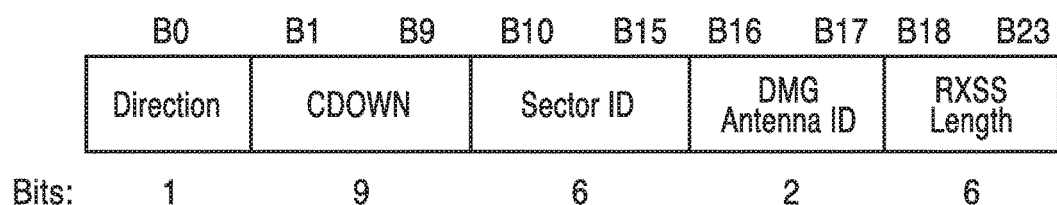

FIG. 8 is a data field format for SSW field in the control frame.

Figure 9A:
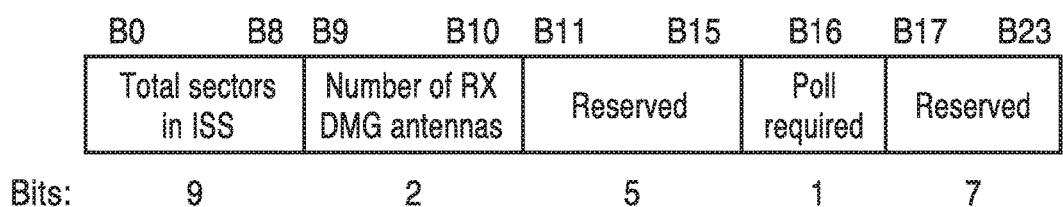
Figure 9B:
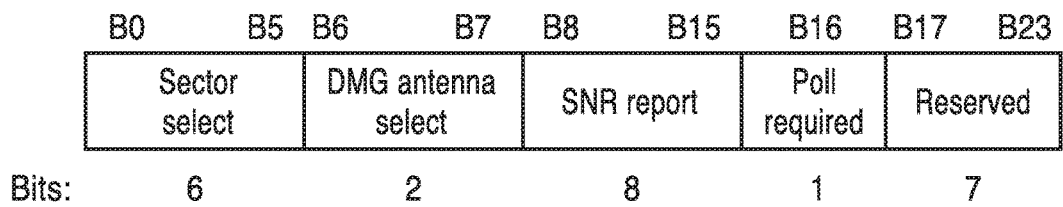

FIG. 9A and FIG. 9B are data field format for the SSW feedback field, with the format seen in FIG. 9A utilized when transmitted as part of an ISS, and the format seen in FIG. 9B utilized when not transmitted as part of an ISS, as per the 802.11ad standard.

Figures 10, 11, 12:
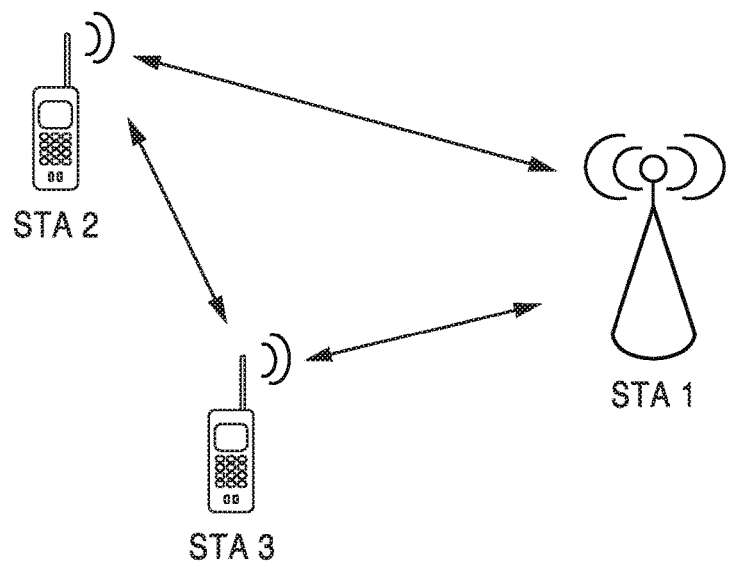

FIG. 10 is a data field format for the sector sweep feedback frame (SSW-feedback) frame in the 802.11ad standard.

FIG. 11 is a radio node diagram utilized by way of example in discussing embodiments of the present disclosure.

FIG. 12 is a data field format for SLS Polling (SLS-P) information element (IE), utilized according to an embodiment of the present disclosure.

Figure 13:
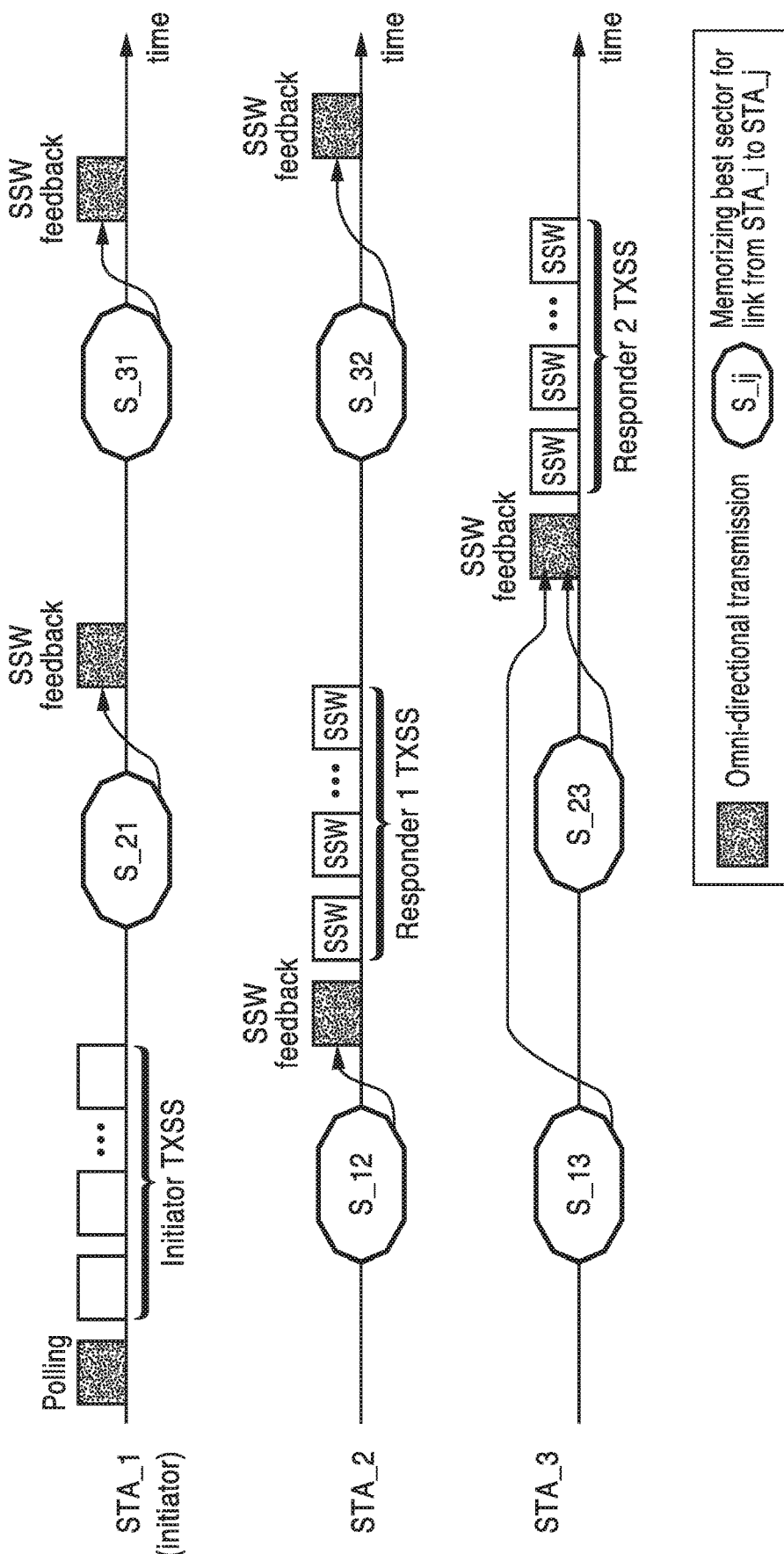

FIG. 13 is a message sequence for the broadcast SLS protocol with immediate SSW feedback according to an embodiment of the present disclosure.

Figure 14:
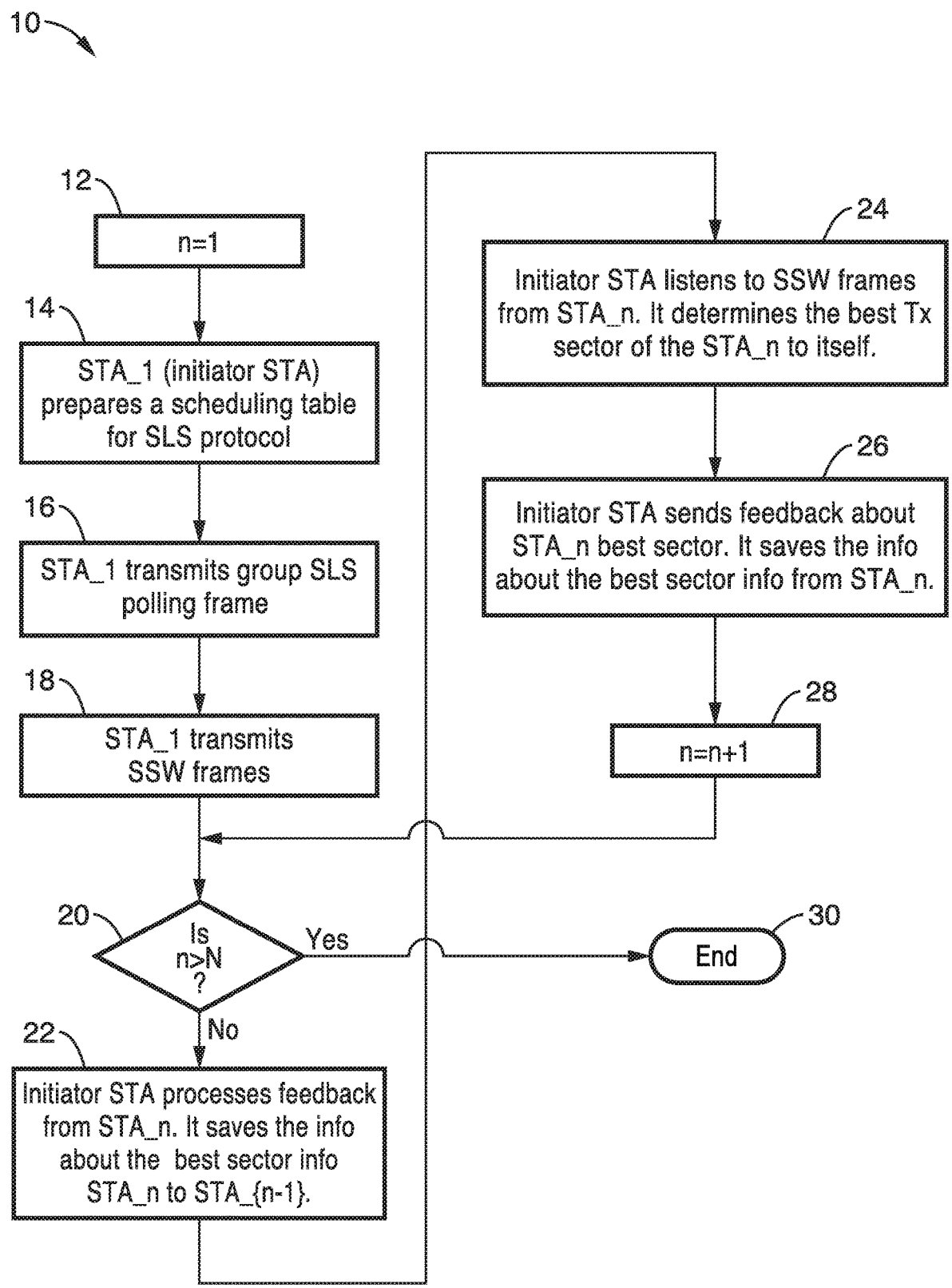

FIG. 14 is a flow diagram for the broadcast SLS protocol with immediate SSW feedback according to an embodiment of the present disclosure.

FIG. 15 is a broadcast SLS polling frame format, according to an embodiment of the present disclosure.

FIG. 16A and FIG. 16B are data field formats for broadcast SLS, showing an SSW frame format and a SLS SSW feedback frame format, respectively, according to an embodiment of the present disclosure.

FIG. 17 is a data field format for the contents of one of the SSW feedback fields shown in FIG. 16B, according to an embodiment of the present disclosure.

Figure 18:
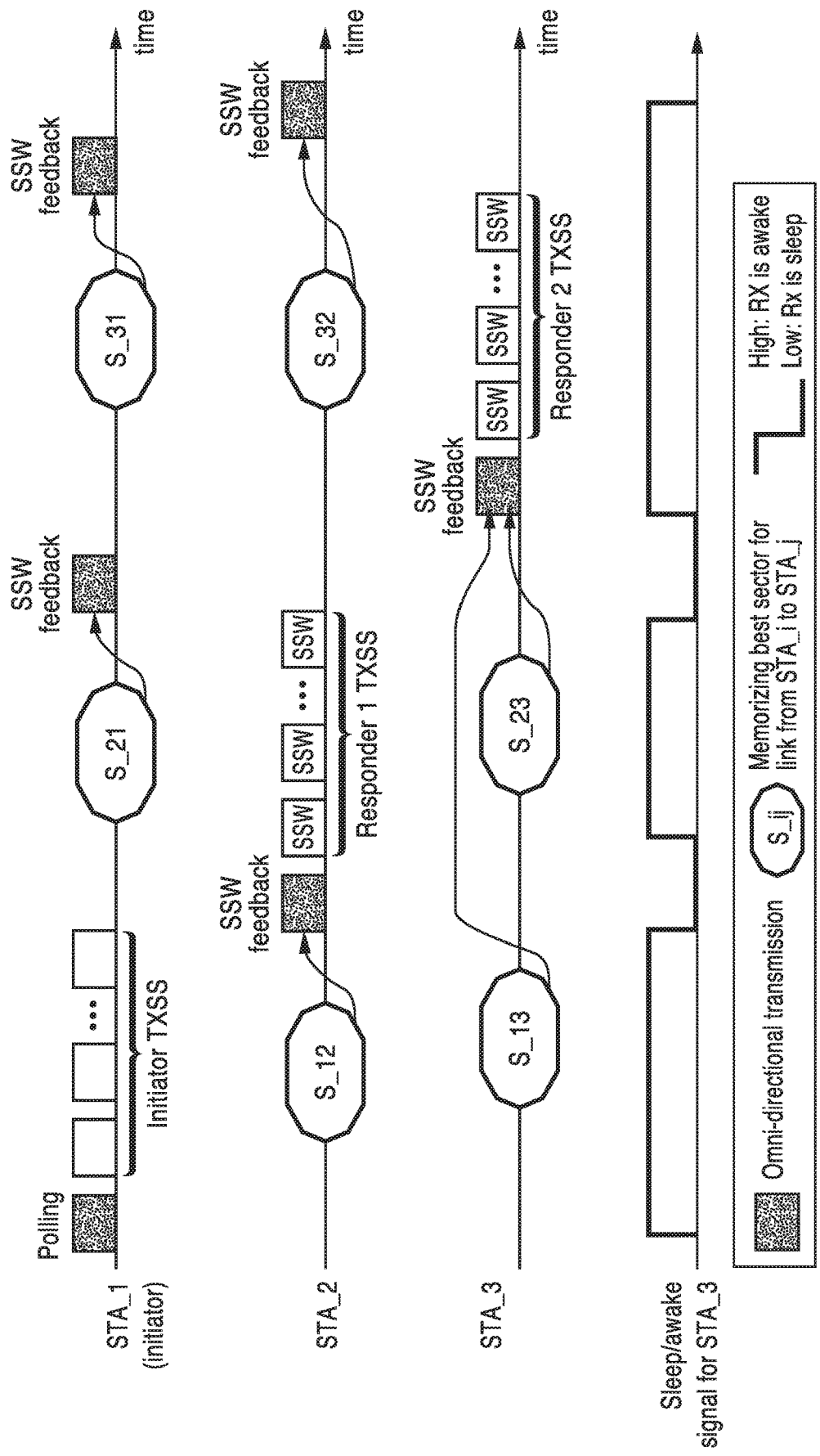

FIG. 18 is a message sequence for the broadcast SLS protocol with power save mode, according to an embodiment of the present disclosure.

Figure 19:
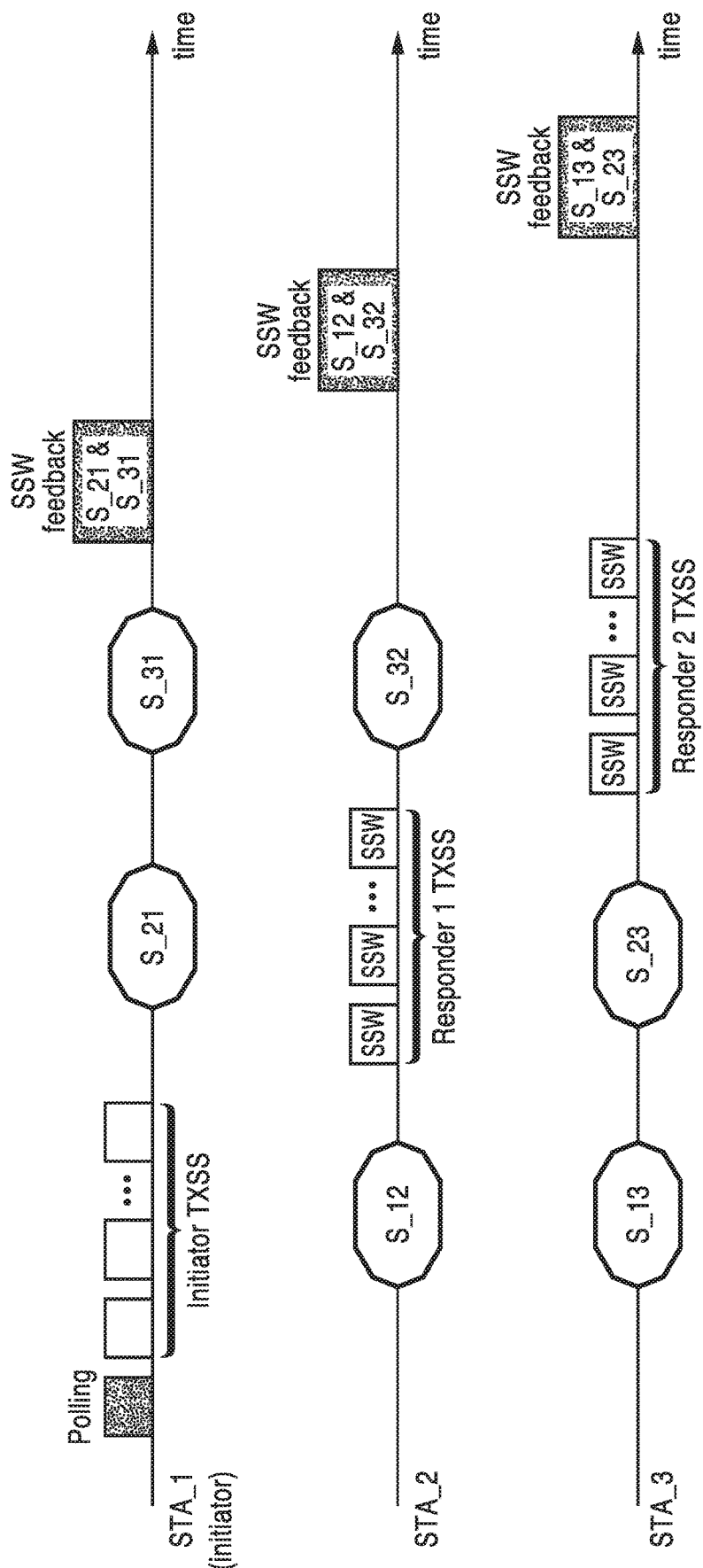

FIG. 19 is a message sequence for the broadcast SLS protocol with delayed feedback, according to an embodiment of the present disclosure.

Figure 20:
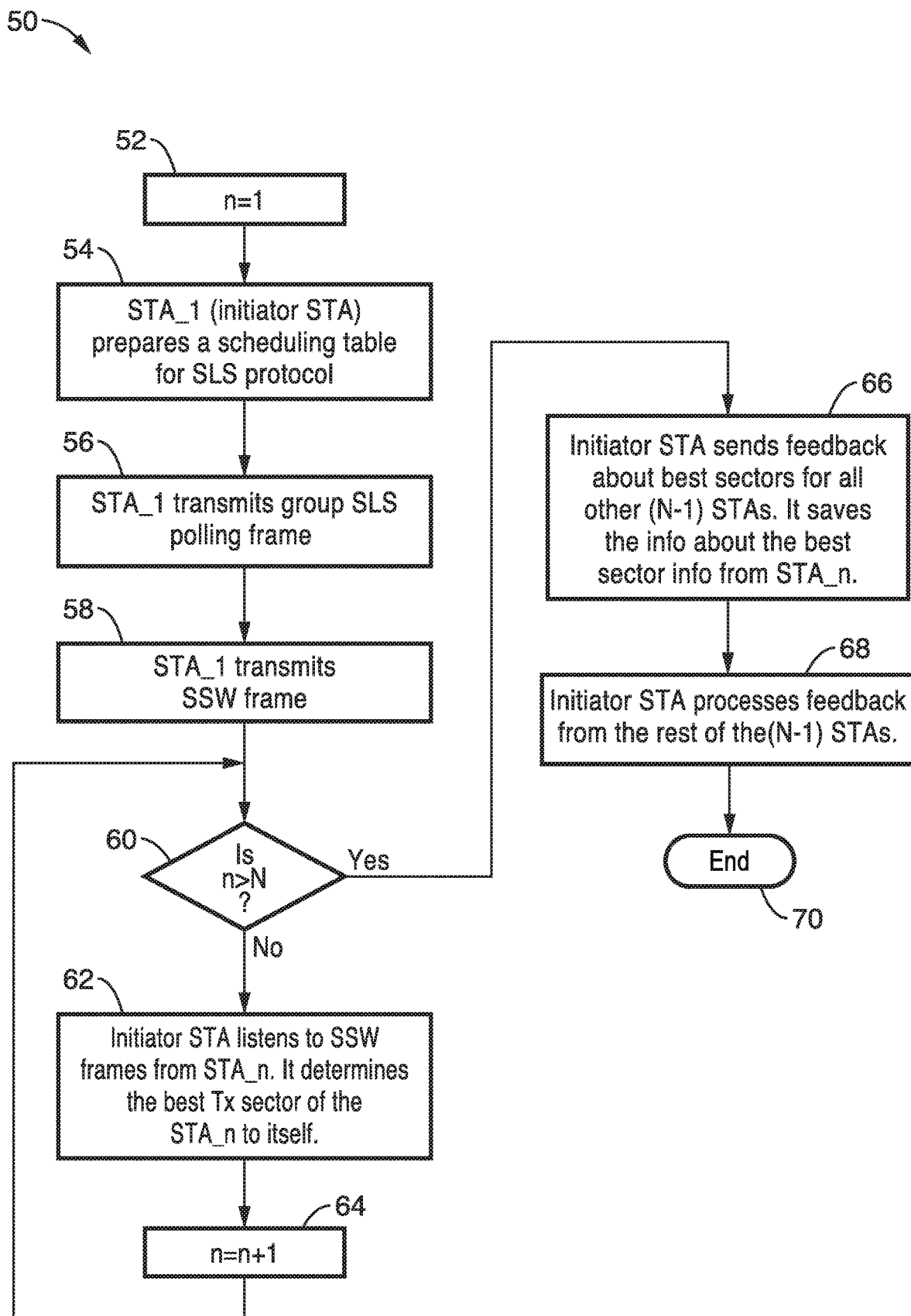

FIG. 20 is a flow diagram of the broadcast SLS protocol with delayed feedback as seen in FIG. 19, according to an embodiment of the present disclosure.

Figure 21:
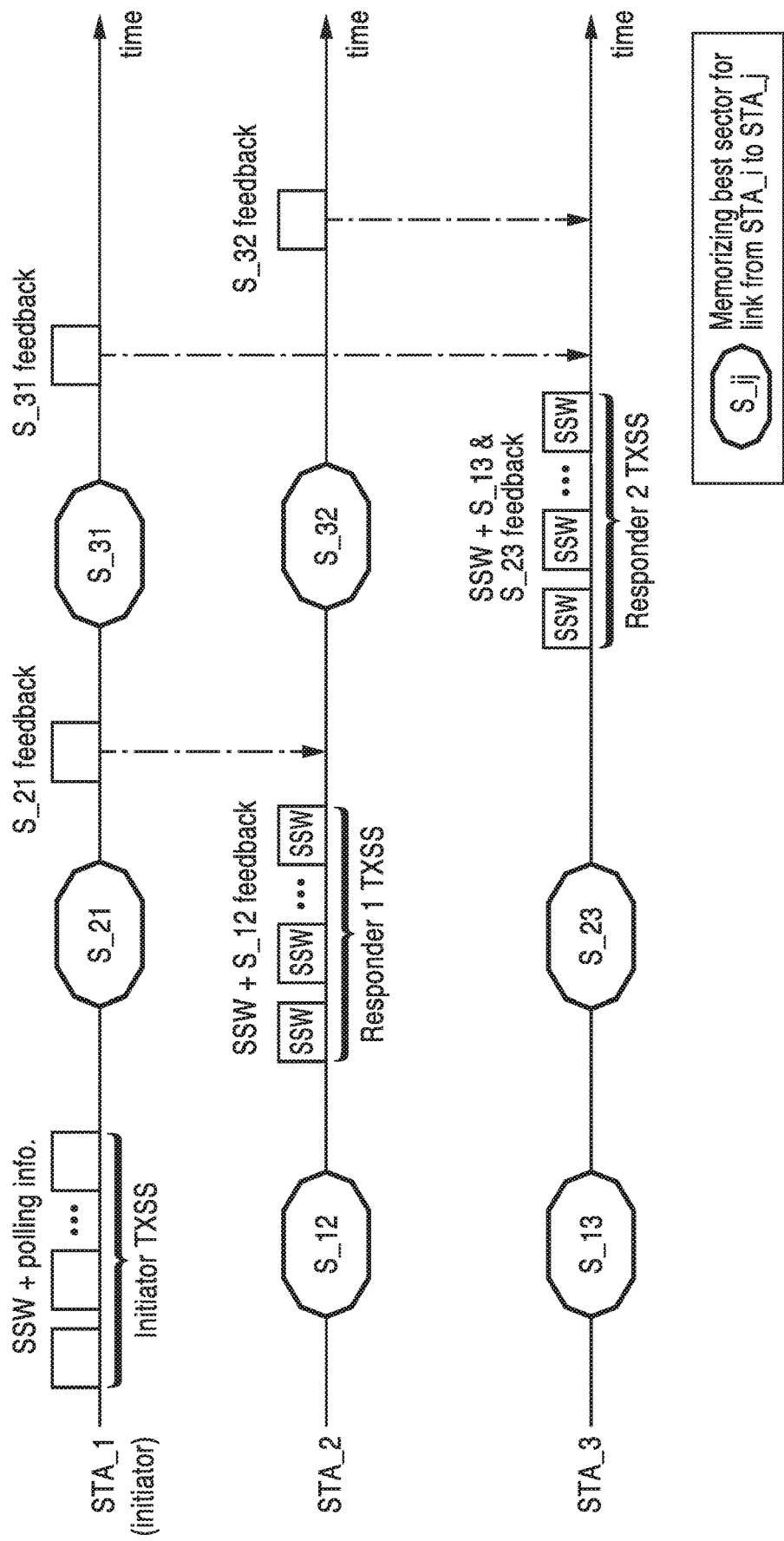

FIG. 21 is a message sequence for the SLS protocol with embedded polling and feedback, according to an embodiment of the present disclosure.

Figure 22:
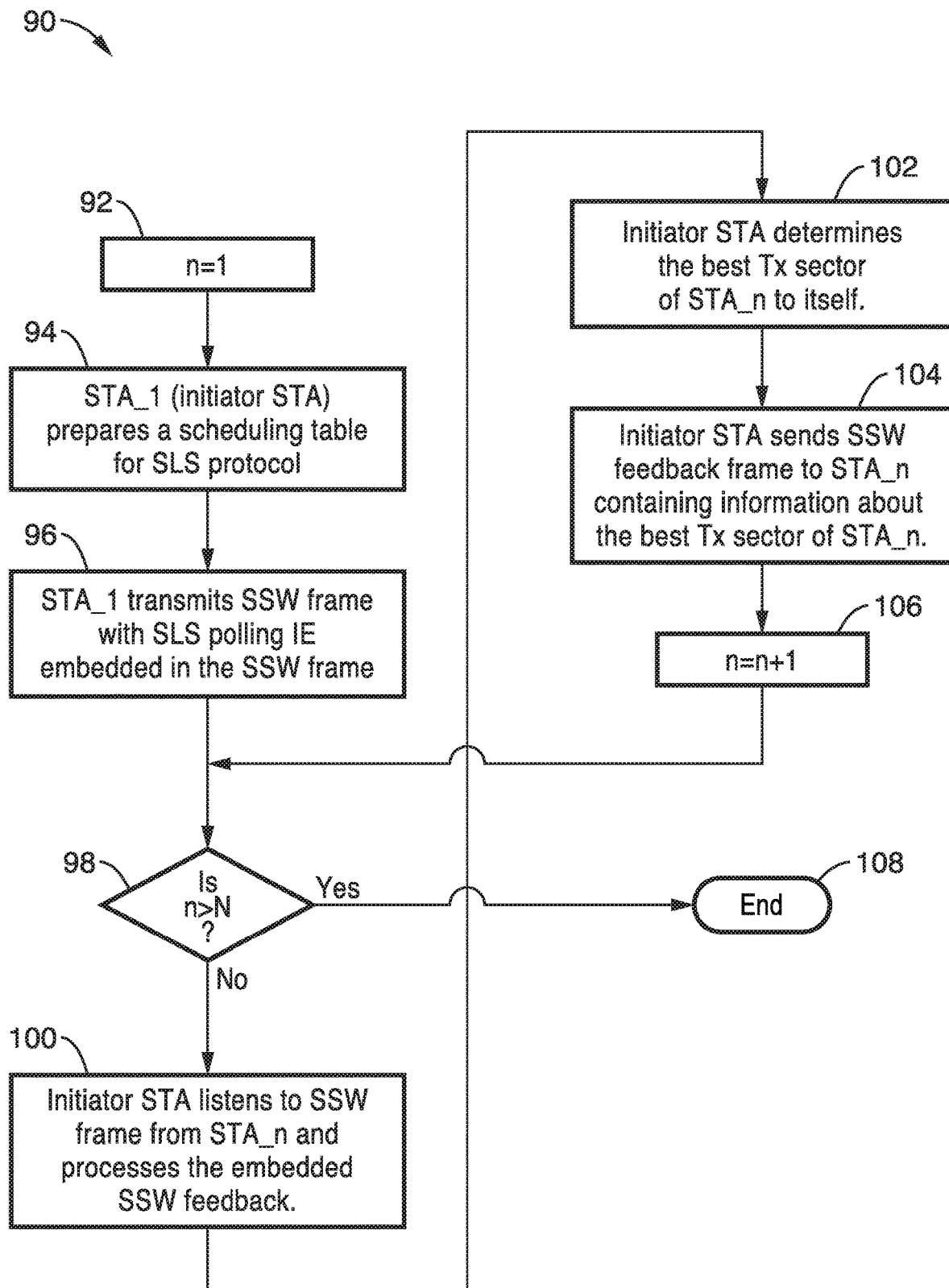

FIG. 22 is a flow diagram of the SLS protocol with embedded polling and feedback as seen in FIG. 21, and depicted from the perspective of the initiator STA, according to an embodiment of the present disclosure.

Figure 23:
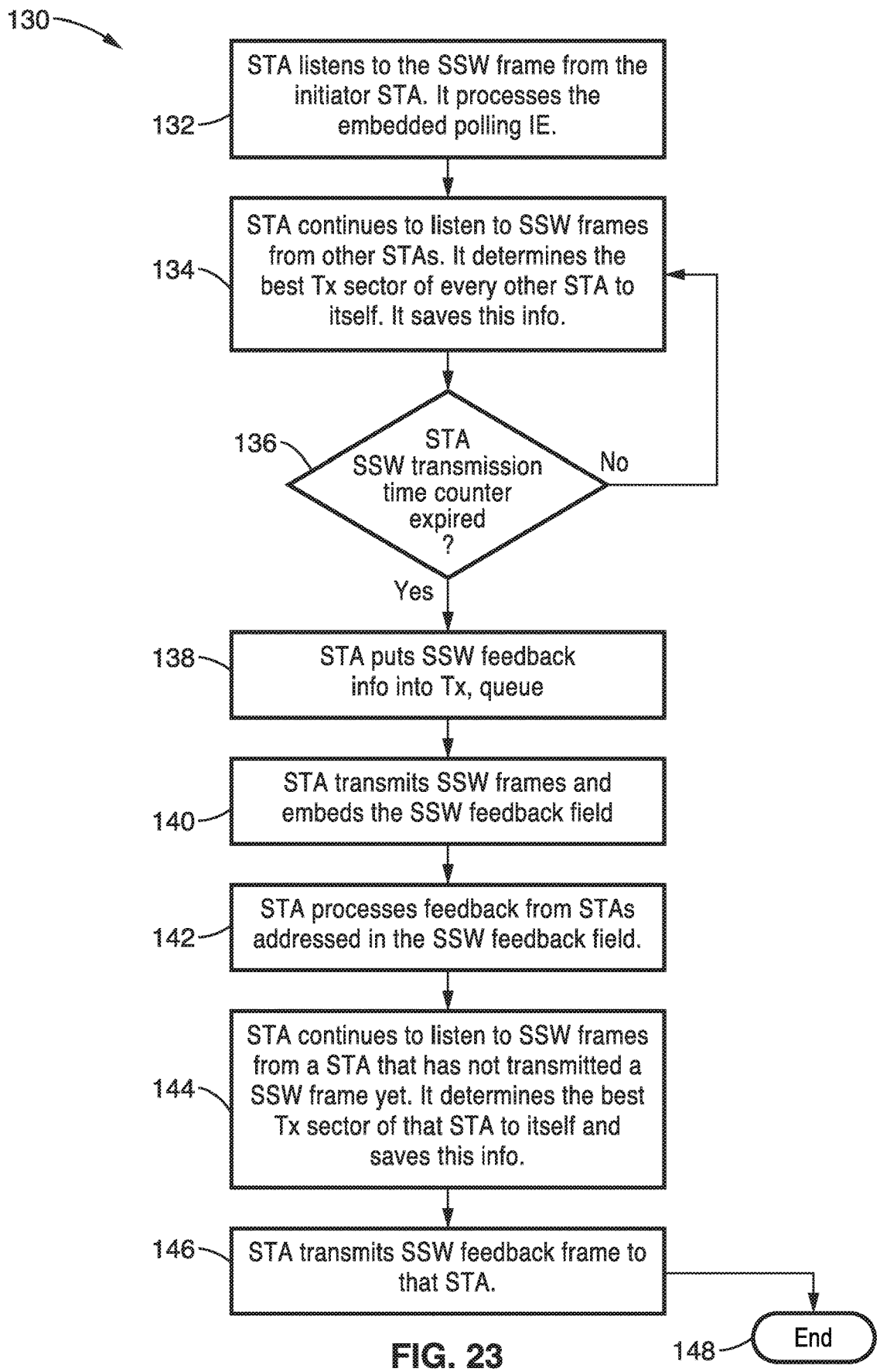

FIG. 23 is a flow diagram of the SLS protocol with embedded polling and feedback as seen in FIG. 21, and depicted from the perspective of a non-initiator STA, according to an embodiment of the present disclosure.

FIG. 24A and FIG. 24B is a data field format for the contents of SSW frame formats from initiator, and non-initiator, respectively, as utilized according to an embodiment of the present disclosure.

DETAILED DESCRIPTION

1. State of the Art mmWave Technology.

An example of a mmWave WLAN state-of-the-art system is the 802.11ad standard. In this standard, BF training is a bidirectional sequence of BF training frame transmissions that utilize sector sweep and provide the necessary signaling to allow each STA to determine appropriate antenna system settings for both transmission and reception.

In 802.11ad the BF training process can be performed in phases. (a) A sector level sweep phase performs directional transmission coupled with low gain (quasi-omni) reception for link acquisition. (b) A refinement stage is performed that adds receive gain and final adjustment for combined transmit and receive. (c) Tracking is performed during data transmission to adjust for channel changes. It should be appreciated that the present disclosure primarily focuses on enhancements to the sector level sweep (SLS) mandatory phase of the 802.11ad standard.

1.1 Sector Level Sweep (SLS) Concept of BF Training.

The following sections describe state of the art BF training according to the 802.11ad standard. During the SLS, a pair of STAs exchange a series of sector sweep (SSW) frames (or beacons in case of transmit sector training at the PCP/AP) over different antenna sectors to find the one providing highest signal quality. The station that transmits first is called the initiator, while the second is referred to as the responder.

During a transmit sector sweep (TXSS), SSW frames are transmitted on different sectors while the pairing node (the responder) receives with a quasi-omni directional pattern. The responder determines the antenna array sector from the initiator which provided the best SNR.

FIG. 2 depicts beam pattern diagrams from a transmitter (STA 1) and a receiver (STA 2), in which the best sectors toward each other are delineated in the figure.

Each packet in the transmit sector sweep includes countdown indication (CDOWN), a Sector ID, and an Antenna ID. The best Sector ID and Antenna ID information are fed back with the Sector Sweep Feedback and Sector Sweep ACK packets.

FIG. 3 depicts a sector level sweep (SLS) between STA 1 and STA 2, in which during an initiator sector sweep (ISS) STA 1 performs a transmit sector sweep (TXSS). During a responder sector sweep (SSW) interval a transmit sector sweep (SSW) is performed by STA 2, with sector sweep feedback (SSW feedback) shown sent to STA 1, which then sends a sector sweep acknowledgement (ACK) back to STA 2.

As an example of applying SLS for multiple STAs, the following considers the SLS that occurs during the beacon header interval (BHI) of the 802.11ad super frame. In this SLS the AP performs the initiator TXSS at the beacon transmission interval (BTI). The STAs hear (receive) this information, and respond by performing a responder TXSS during the A-BFT period.

FIG. 4 depicts the beacon header interval (BHI), showing sector level sweeping with an initiator TXSS during the beacon transmission interval (BTI), with multiple responders performing a TXSS during the association-beamforming training (A-BFT) period.

However, the STAs respond to the TXSS in an uncoordinated fashion. In particular, the STAs perform random back-off, with a collision being assumed if no SSW feedback is received from the AP. The SSW ACK could be transmitted during the Announcement Transmission Interval (ATI).

FIG. 5 depicts a message sequence exemplifying SLS BF training procedure between an AP and multiple STAs in 802.11ad. In the figure is shown the activity by the AP/PCP (PCP stands for PBSS control point) in the top row with activity for STA 1 and STA 2 in the rows beneath. During the BTI interval an initiator TXSS is performed by AP/PCP using SSW frames (DMG beacons) which is received by STA 1 (state S_12), and STA 2 (state S_13). During the A-BFT interval, STA 1 is the first responder to perform a TXSS, showing SSW frames back to the AP/PCP. The responder TXSS are received (state S_21), and the AP/PCP sends SSW feedback to STA 1. Some period later in the A-BFT, STA 2 performs a response TXSS, which is received (state S_31) by the AP/PCP which responds to STA 2 with SSW feedback.

FIG. 6 is an example of contention which can arise between multiple responders during the A-BFT period. The current state-of-the art 802.11ad implementation of training a group of multiple STAs leads to contention during the A-BFT. In the figure an example is shown having A-BFT with length 8 and with each SSW slot accommodating 8 SSW frames. A possible contention arises between 3 STAs, as (STA A, STA B and STA C), which are competing for access. In this scenario all STAs choose a random value between [0,7]. In the example shown, STA A chooses a value of 2, while STAs B and C choose a value of 5, which might result in a collision of their communications with the AP/PCP.

FIG. 7 depicts the fields for the sector sweep frame (an SSW frame) as utilized in the 802.11ad standard, with the fields outlined below. The Duration field is set to the time until the end of the SSW frame transmission. The RA field contains the MAC address of the STA that is the intended receiver of the sector sweep. The TA field contains the MAC address of the transmitter STA of the sector sweep frame.

FIG. 8 illustrates data fields for the SSW field. The principle information conveyed in the SSW field is as follows. The Direction field is set to 0 to indicate that the frame is transmitted by the beamforming initiator and set to 1 to indicate that the frame is transmitted by the beamforming responder. The CDOWN field is a down-counter indicating the number of remaining DMG Beacon frame transmissions to the end of the TXSS. The sector ID field is set to indicate sector number through which the frame containing this SSW field is transmitted. The DMG Antenna ID field indicates which DMG antenna the transmitter is currently using for this transmission. The RXSS Length field is valid only when transmitted in a CBAP and is reserved otherwise. This RXSS Length field specifies the length of a receive sector sweep as required by the transmitting STA, and is defined in units of a SSW frame. The SSW Feedback field is defined below.

FIG. 9A and FIG. 9B depict an SSW feedback field. The format shown in FIG. 9A is used when transmitted as part of an ISS, while the format of FIG. 9B is used when not transmitted as part of an ISS. The Total Sectors in the ISS field indicate the total number of sectors that the initiator uses in the ISS. The Number of RX DMG Antennas subfield indicates the number of receive DMG antennas the initiator uses during a subsequent Receive Sector Sweep (RSS). The Sector Select field contains the value of the Sector ID subfield of the SSW field within the frame that was received with best quality in the immediately preceding sector sweep. The DMG Antenna Select field indicates the value of the DMG Antenna ID subfield of the SSW field within the frame that was received with best quality in the immediately preceding sector sweep. The SNR Report field is set to the value of the SNR from the frame that was received with best quality during the immediately preceding sector sweep, and which is indicated in the sector select field. The Poll Required field is set to 1 by a non-PCP/non-AP STA to indicate that it requires the PCP/AP to initiate communication with the non-PCP/non-AP. The Poll Required field is set to 0 to indicate that the non-PCP/non-AP has no preference about whether the PCP/AP initiates the communication.

FIG. 10 depicts data fields for the sector sweep feedback frame (SSW-feedback frame) in the 802.11ad standard. The Duration field is set to 0 when the SSW-Feedback frame is transmitted within an association beamforming training (A-BFT). Otherwise, the duration field is set to the time, in microseconds, until the end of the current allocation. The RA field contains the MAC address of the STA that is the intended destination of SW-Feedback frame. The TA field contains the MAC address of the STA transmitting the SSW-Feedback frame. The BRP request field provides information necessary for initiating the BRP process. The Beamformed Link Maintenance field provides the DMG STA with the value of a beam Link Maintenance Time. If the beam Link Maintenance Time elapses, the link operates in quasi-omni Rx mode.

With the above background on conventional state of the art 802.11ad mmWave operations, the distinctions of the disclosed apparatus and method should be more readily understood.

2. Introduction to Disclosed TXSS Training.

The following sections disclose various embodiments of SLS

Protocol and variations thereof.

2.1 General Description of SLS Protocol.

FIG. 11 illustrates an example radio node network, showing an AP (STA 1) along with two stations (STA 2, STA 3), for which mutual TXSS training is performed between STAs, and upon which the following example embodiments are described. The proposed group SLS protocol is applicable for wireless networks, and is particularly well-suited for mmWave wireless networks. The teachings of the present disclosure provide a number of benefits, including the following. (a) Coordination of SSW frames and feedback as controlled by an initiator STA. This polling of training signaling prevents contention between the STAs to transmit SSW frames. (b) Every STA transmits SSW frames once, then at the end of the SLS phase, the STAs exchange best sector info. (c) In one implementation of the disclosed SLS protocol, every STA may be also informed about the best transmit sector for each link within the network of contributing nodes.

2.2 SLS Polling (SLS-P) Information Element (IE).

FIG. 12 illustrates a data field format for SLS Polling (SLS-P) information element (IE). This information is commonly used for all types of practice in the present disclosure. The coordinator transmits polling information to coordinate SSW frames. An AP in the network can function as the coordinator, while in other cases a non-AP STA may be utilized. SLS-P IE has the following fields. IE ID is the number of bits interpreted by the STAs as the SLS polling announcement IE. The Length field is the length in bytes of the IE. STA IDs field is an ordered list of STA IDs to be engaged in the group SLS training. The Timing offsets field is the ordered list of time offsets for either SSW transmission or SSW feedback. The Usage field is a bit that indicates either SSW or SSW feedback.

2.3 Broadcast SLS Protocol Overview.

Consider one embodiment of the proposed group SLS, where the STAs contributing in the group SLS protocol are within close range. In this case, transmission and reception with quasi-omni mode (no Tx or RX directivity) with the use of a low rate control PHY can still provide reliable communications. For example a transmission with the following parameters MCSO of 802.11ad, Tx power approximately 17 dBm (for all STAs), Max inter-distance between STAs of about 15 meters; results in an RSSI around −74 dBm which is higher than the MCSO sensitivity of −78 dbm at 2 GHz of bandwidth.

2.3.1 Broadcast SLS Protocol with Immediate SSW Feedback.

In this example scenario, the group SLS protocol operates as follows. The initiator STA (e.g., AP/PCP) starts by transmitting a polling signal (in quasi-omni mode) which includes: (a) ID of STAs engaged in the SLS training protocol, (b) the transmission time of SSW frames for each contributing STA, and (c) the transmission time of the SSW Feedback frames. The initiator STA then transmits the SSW frames. All other STAs receive and follow the timings of the polling signal to transmit their SSW frames followed by SSW feedback. All STAs that receive the SSW frames memorize (store) the best sector for that link and transmit this information in the feedback SSW frames. In this close range embodiment, the feedback SSW frames are preferably sent in quasi-omni mode. Thus, this information may be received by all other STAs in the BSS. Accordingly, it will be recognized that this embodiment decouples the feedback information from the SSW frames.

FIG. 13 illustrates an example message sequence using the broadcast SLS protocol with immediate SSW feedback. In this figure communications are shown between the initiator (STA 1) depicted on the top line of the figure, and STA 2 and STA 3 seen in the lower lines of the figure. Polling, using omni-directional transmission, is shown for STA 1 followed by initiator TXSS. The polling frame contains information when each of the scheduled transmission from STA 2 and STA 3 shall be transmitted, so that they do not collide each other. This activity is registered by STA 2 and STA 3 in states S_12 and S_13, shown respectively, which memorize (store) the best directional sectors for the specific link. Then STA 2 provides SSW feedback, using omni-directional transmission, following by generating a first responder TXSS. STA 1 and STA 3 register this activity by STA 2. Directly after the end of the first responder TXSS, STA 1 provides SSW feedback to STA 2. Afterwards, STA 3 provides SSW feedback to STA 2, using omni-directional transmission and according to the timing provided by the polling signal, then generates a second responder TXSS. This activity is shown registered by STA 1 (state S_31), and STA 2 (state S_32), with the states again storing the best sectors for the respective communications.

FIG. 14 illustrates an example flow diagram 10 for the broadcast SLS protocol with immediate SSW feedback according to an embodiment of the present disclosure. A value n, representing the station number, is initiated such as to one (1) at block 12, while the total number of stations in the network (BSS) at the given time is given by the value N. The initiator (e.g., STA 1) prepares 14 a scheduling table for the SLS protocol. STA 1 transmits 16 a group SLS polling frame that conveys the contents of the scheduling table to the STAs participating in the group SLS protocol. STA 1 transmits SSW frames 18. A decision is made 20 if n is greater than N, to determine if all stations have been processed. If yes, then processing moves to completion (End) 30 for all the stations. If n is still less than or equal to N, then processing continues with block 22, as the initiator processes feedback from STA n, and saves information about best sector information from STA n to STA n−1. The initiator STA then listens (monitors and receives) 24 to SSW frames from STA n, and determines the best transmit sector of the communication from STA n to itself. Initiator STA sends feedback 26 about STA n best sector and saves information about the best sector from STA n. The value n is incremented 28 for the next pass, with execution returning to block 20, until n becomes greater than N. It will be appreciated that one of ordinary skill in the art can modify the flow diagram in a number of ways without departing from the present disclosure which performs the described processing for each of the stations.

FIG. 15 is an SLS beamforming polling frame, having the following fields. The Frame Control field contains information about the type of frame, power management information, retried frame, and so forth. The Duration field indicates the duration of the frame in microseconds. The RA field is a MAC address that identifies the intended recipient STA(s), and in this instance RA is set to a broadcast group address. The TA field is a MAC transmitter address that identifies the STA that has transmitted this frame. The SLS-P IE field is the SLS polling information element, as described in a previous section. The FCS field is a frame check sequence that validates the reception of the frame contents.

FIG. 16A illustrates an example of a broadcast SLS SSW frame format. The SLS SSW feedback frame format includes the following fields. The Frame Control field contains information about the type of the frame, power management information, retried frame, and so forth. The Duration field indicates duration of the frame in microseconds. The RA field is a MAC address that identifies the intended recipient STA(s), and is set to broadcast or multicast. The TA field is a MAC address that identifies the STA that transmits the frame. The SSW field was described in FIG. 8. The FCS field is a frame check sequence that validates the reception of the frame contents. In this embodiment the SSW feedback is decoupled from the SSW frames.

FIG. 16B illustrates an example format for a broadcast SLS SSW feedback frame. The Frame Control field contains information about the type of frame, power management information, retried frame, and so forth. The Duration field indicates the duration of the frame in microseconds. The RA field is a MAC address that identifies intended recipient STA(s), set to broadcast or multicast. The TA field is a MAC address that identifies the STA that transmits the frame. The SSW Feedback field contains multiple fields, with one field for each STA in the local network, for example from 1 . . . N fields, where N is the number of STAs. The FCS field is a frame check sequence that validates the reception of the frame contents.

FIG. 17 illustrates example fields within one of the SSW feedback fields seen in FIG. 16B. The SSW Feedback field contains the following fields. The STA ID subfield represents which neighbor STA the SSW Feedback is intended for. The Sector Select subfield is the value of the Sector ID subfield of the SSW field within the frame that was received with best quality in the immediately preceding sector sweep from STA 1. Antenna Select subfield is the value of the DMG Antenna ID subfield of the SSW field within the frame that was received with best quality in the immediately preceding sector sweep from STA 1. The SNR Report subfield is the value of the SNR from the frame that was received with best quality during the immediately preceding sector sweep, and which is indicated in the sector select field.

FIG. 18 illustrates a time chart for the broadcast SLS protocol with power save mode. In this embodiment of the SLS protocol a power save mode is provided in which each STA, based on polling signal contents, schedules sleep/awake periods for the receiver. Each STA performs mutual TXSS with every other STA in the network, however it ignores the best sector info of the links that this STA is not part of.

Referring to FIG. 18, it can be seen that this timing is almost identical to that of FIG. 13, with the addition of a power save mode. The bottom row of the figure depicts a sleep/awake signal for STA 3, so that when this signal is high the receiver of STA 3 is awake, and when the signal is low, the receiver of STA 3 is asleep. This signal is generated by each STA after processing the polling frame contents transmitted by the initiator STA at the beginning of the group SLS protocol. For example, STA 3 receiver will stay awake until it detects a polling signal. From the polling signal it will identify the start time of transmission of the SSW frames by different STAs, including the initiator STA. The STA 3 receiver is awake during these SSW frame transmissions and also right after its own SSW frames transmission when it expects to detect the corresponding SSW feedback from the other STAs. The STA 3 receiver goes into a doze (sleep) mode during the transmission of SSW feedback frames from other STAs that are not in reply to STA 3 SSW frames.

FIG. 19 illustrates a broadcast SLS protocol which uses delayed feedback. It can be seen that the first portion of this messaging timeline is almost identical to that of FIG. 13, however, the SSW feedback signals are combined and delayed until a period for SSW feedback signals. This embodiment utilizes two periods, the first for SSW frames and a second for feedback signals as shown in the figure. The feedback signal in this case can aggregate best sector contents about multiple STAs. As seen in the figure, the stations do not send their SSW feedback signal until after all stations have performed their TXSS, with the initiator being first to send its SSW feedback, and the other stations following to transmit their respective SSW feedback. In this embodiment feedback overhead is reduced, while scheduling of SSW and SSW feedback transmissions is simplified.

FIG. 20 illustrates an example embodiment 50 of this delayed SSW feedback as seen in FIG. 19, and as controlled by the initiator STA. A value n, representing station number is initiated, such as to 1, at block 52, while the total number of stations participating in the group SLS belonging to the network (BSS) is given by the value N. The initiator (e.g., STA 1) prepares 54 a scheduling table for SLS protocol. STA 1 transmits a group SLS polling frame that conveys the contents of the scheduling table to the rest of the STAs 56, followed by transmitting SSW frames 58. A decision is made 60 if n is greater than N, which is a determination that all stations have performed TXSS processing. If not, (n is still less than N), then processing continues with block 62, as the initiator listens (monitors and receives) and processes feedback from STA n, and saves information about best (e.g., lowest noise) transmit sector from STA n to itself. The initiator STA then listens (monitors and receives) 64 SSW frames from STA n, and determines the best transmit sector of the communication from STA n to itself. Then value n is incremented 64 for the next pass, and execution returns to block 60. When at block 60 n is found greater than N, then execution moves to block 66, in which the initiator STA sends feedback about best sectors for all other (N−1) stations, and saves the information about the best sector information from STA n. After this, the initiator STA processes 68 feedback from the rest of the (N−1) stations, and the routine ends 70. It will be appreciated one of ordinary skill in the art can modify this flow diagram, and others in the present disclosure, in a number of ways without departing from the teachings herein.

2.4 SLS Protocol with Embedded Polling and Feedback.

In this embodiment, since the STAs are not considered within close range, transmission is made with Tx directivity to overcome link budget limitations. Three of the basic steps of this process are described as follows. (i) The polling signal is contained in the initiator SSW frames. (ii) The SSW frames of the responder STAs carry feedback about the best sector for the link with the initiator or other STA whose SSW frames have been just transmitted. (iii) The feedback signals (SSW feedback) are transmitted with the best array sector according to the information carried in the SSW frames of the STA at the other end of the link. At the end of the SLS protocol, mutual TXSS exchange is achieved between each STA and every other STA in the network.

FIG. 21 illustrates an SLS protocol which uses transmit beamforming for the polling and the SSW feedback signals. It can be seen in this messaging timeline, that there is no polling transmission block as was seen in FIG. 13. Instead, the initiator polling signal is contained in the initiator SSW frames (SSW+polling info). The SSW feedback is either contained within the SSW frames (e.g., SSW+S_12 feedback and SSW+S_13 & S_23) or transmitted separately by a STA in a Beamformed manner if that STA has already transmitted SSW frames in the past. This distinction of transmission of SSW feedback either embedded on top of SSW frames or in a separate transmission block is further illustrated in the non-initiator STA flowchart of FIG. 23.

FIG. 22 illustrates an example embodiment 90 of this embedded polling and feedback as seen in FIG. 21, from the perspective of the initiator STA. A value n, representing the station number is initiated, such as to 1, at block 92. The total number of stations in the network that participate in the SLS training protocol at the given time is given by the value N. The initiator STA (e.g., STA 1) prepares 94 a scheduling table for SLS protocol. STA 1 transmits 96 a SSW frame with SLS polling IE embedded in the SSW frame. A decision is made 98 if n has reached greater than N, that is to say if all stations have been processed. If yes, n is greater than N, then processing is completed for all the stations and end 108 is reached. However, if n is still less than or equal to N, then processing continues with block 100, as the initiator STA listens to (monitors and receives) SSW frames from the n station and processes embedded SSW feedback from that station. In block 102, the initiator STA determines the best Tx sector of STA n to itself. In block 104, the initiator STA sends in a directed transmission, based on the processed SSW feedback received from STA n, an SSW feedback frame to STA n containing information about the best Tx sector for that station. The value n is incremented 106 for the next pass, with execution returning to block 98, with that loop proceeding until n becomes greater than N. It will be appreciated that one of ordinary skill in the art can modify the flow diagram above in a number of ways without departing from the present disclosure.

FIG. 23 illustrates an example embodiment 130 of this embedded polling and feedback from the perspective of a non-initiator station which provides delayed feedback. The STA listens to the SSW frame from the initiator STA, and processes its embedded polling IE. This non-initiator station then continues to listen 134 to SSW frames from other STAs, and both determines and saves the best Tx sector of every other STA to itself. In block 136 this non-initiator station determines if its SSW transmission time counter has expired. This counter is activated after processing the polling IE from the initiator STA with its value determined from the polling IE contents. This counter expires once the SSW frame transmissions are performed by this non-initiator STA. If the time counter has not expired, then execution returns to block 134, with this non-initiator STA listening to SSW frames of other STAs. Otherwise, if the station time counter has expired, then this non-initiator STA puts 138 SSW feedback information into a Tx queue. The station transmits 140 SSW frames and embeds the SSW feedback field. This non-initiator STA then processes 142 feedback from other STAs as addressed in the SSW feedback field, and continues to listen 144 to SSW frames from a STA that has not transmitted an SSW frame yet, and both determines and saves the best Tx sector of that STA to itself. Then this non-initiator STA transmits 146 SW feedback frame to that STA, to thus end 148 the routine.

FIG. 24A illustrates example fields within an initiator SLS SSW frame. The Frame Control field contains information about the type of frame, power management information, retried frame, and so forth. The Duration field provides duration information about the frame in microseconds. The RA field is a MAC address that identifies the intended recipient STA(s), in which the RA is set to a broadcast group address. The TA field is a MAC address that identifies the STA that transmits the frame. The SSW field was previously defined. The SLS_P IE field is the SLS polling information element which was previously defined. The FCS field is a frame check sequence that validates the reception of the frame contents.

FIG. 24B illustrates example fields within the non-initiators SLS SSW frame. The Frame Control field contains information about the type of the frame, power management information, retried frame, and the like. The Duration field provides the duration of the frame in microseconds. The RA field is a MAC address that identifies the intended recipient STA, and is set to broadcast or multicast. The TA field is a MAC transmitter address that identifies the STA that has transmitted this frame. The SSW field and SSW Feedback field have been previous defined. The FCS field is a frame check sequence that validates the reception of the frame contents.

The enhancements described in the presented technology can be readily implemented within various wireless radio networking nodes (e.g., APs and STAs). It should also be appreciated that each of these wireless radio nodes are preferably implemented to include at least one computer processor device (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in the diagrams for the sake of simplicity of illustration, as one of ordinary skill in the art recognizes the use of computer devices for carrying out steps involved with networked radio communication. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, computer processor, central processing unit (CPU), and computer are used synonymously to denote a device capable of executing the instructions and communicating with input/output interfaces and/or peripheral devices, and that the terms processor, computer processor, CPU, and computer are intended to encompass single or multiple devices, single core and multicore devices, and variations thereof.

From the description herein, it will be appreciated that that the present disclosure encompasses multiple embodiments which include, but are not limited to, the following:

1. A wireless radio communication apparatus providing directional transmission between multiple wireless radio communication devices, comprising: (a) a transmitter configured for generating directional radio transmissions to other wireless radio communication devices which are in range; (b) a receiver configured for receiving radio transmissions from other wireless radio communication devices; (c) a computer processor coupled to said transmitter and said receiver for controlling communications between itself and other wireless radio communication devices; (d) a non-transitory computer-readable memory storing instructions executable by the computer processor; (e) wherein said instructions, when executed by the computer processor, perform steps comprising: (e)(i) commencing a sector level sweep (SLS) process in which beamforming training is performed as transmitter sector sweep (TXSS) training, in which a sector sweep (SSW) is transmitted, followed by generating sector sweep (SSW) feedback for receipt by the other wireless radio communication devices; (e)(ii) receiving sector sweep frames from the other wireless radio communication devices; (e)(iii) receiving sector sweep feedback information from the other wireless radio communication devices; and (e)(iv) exchanging optimum transmit sector information with the other wireless radio communication devices without incurring transmit contention.

2. The apparatus of any preceding embodiment, further comprising executing said instructions for learning transmitter sector sweep (TXSS) training results from the other wireless radio communication devices.

3. The apparatus of any preceding embodiment, wherein said wireless radio communication apparatus comprises an access point (AP), or a station (STA).

4. The apparatus of any preceding embodiment, wherein said transmitter sector sweep (TXSS) training as initiated by said computer processor when that station is a master station within a plurality of wireless radio communication devices.

5. The apparatus of any preceding embodiment, wherein said transmitter sector sweep (TXSS) training as initiated in response to receiving an initiator TXSS from a master station within a plurality of wireless radio communication devices.

6. The apparatus of any preceding embodiment, wherein said commencing a sector level sweep (SLS) process is initiated by said computer processor as an initiator, or another wireless radio communication apparatus acting as initiator, by transmitting a polling signal, followed by initiator transmit sector sweep (TXSS) training.

7. The apparatus of any preceding embodiment, wherein said polling signal is transmitted in quasi-omni directional mode.

8. The apparatus of any preceding embodiment, further comprising executing instructions for controlling sleep and awake cycling of said wireless radio communication apparatus for a transmitter sector sweep (TXSS) power saving mode.

9. The apparatus of any preceding embodiment, further comprising executing instructions for delaying said generating of sector sweep (SSW) feedback, until all sector sweeping transmissions have been performed.

10. The apparatus of any preceding embodiment, further comprising executing instructions for aggregating best sector contents about multiple stations when generating said sector sweep (SSW) feedback.

11. The apparatus of any preceding embodiment, wherein said instructions execute generating of sector sweep (SSW) feedback by using a MAC broadcast and a PHY quasi-omni direction mode.

12. The apparatus of any preceding embodiment, further comprising executing instructions for an embedded polling and feedback mode in which a polling signal is contained in sector sweep (SSW) frames sent by an initiator, while SSW frames from each responder station carries feedback about best sector for a link with the initiator or other stations whose SSW frames have been transmitted, then the SSW feedback is transmitted with the best array sector according to the information carried in the SSW frames of the other wireless radio communication devices.

13. The apparatus of any preceding embodiment, wherein said transmitter and receiver operate at millimeter-wave (mmWave) radio frequencies.

14. The apparatus of any preceding embodiment, wherein said wireless radio communication device and the other wireless radio communication devices form a wireless local area network (WLAN).

15. A wireless radio communication apparatus providing directional transmission between multiple wireless radio communication devices, comprising: (a) a transmitter configured for generating directional radio transmissions to other wireless radio communication devices which are in range; (b) a receiver configured for receiving radio transmissions from other wireless radio communication devices; (c) a computer processor coupled to said transmitter and said receiver for controlling communications between itself and other wireless radio communication devices; (d) a non-transitory computer-readable memory storing instructions executable by the computer processor; (e) wherein said instructions, when executed by the computer processor, perform steps comprising: (e)(i) commencing a sector level sweep (SLS) process in which beamforming training is performed as transmitter sector sweep (TXSS) training, in which a sector sweep (SSW) is transmitted, followed by generating sector sweep (SSW) feedback for receipt by the other wireless radio communication devices; (e)(ii) receiving sector sweep frames from the other wireless radio communication devices; (e)(iii) receiving sector sweep feedback information from the other wireless radio communication devices; and (e)(iv) exchanging optimum transmit sector information among wireless radio communication devices that are not coordinator, whereby nearby wireless radio communication devices mutually learn best sector information.

16. The apparatus of any preceding embodiment, wherein said wireless radio communication apparatus comprises an access point (AP), or a station (STA).

17. The apparatus of any preceding embodiment, wherein said transmitter sector sweep (TXSS) training as initiated by said computer processor when that station is a master station within a plurality of wireless radio communication devices.

18. The apparatus of any preceding embodiment, wherein said transmitter sector sweep (TXSS) training as initiated in response to receiving an initiator TXSS from a master station within a plurality of wireless radio communication devices.

19. The apparatus of any preceding embodiment, further comprising executing instructions for controlling sleep and awake cycling of said wireless radio communication apparatus for a transmitter sector sweep (TXSS) power saving mode.

20. The apparatus of any preceding embodiment, further comprising executing instructions for delaying said generating of sector sweep (SSW) feedback, until all sector sweeping transmissions have been performed.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A wireless radio communication apparatus providing directional transmission between multiple wireless radio communication devices, comprising:
    (a) a transmitter configured for generating directional radio transmissions to other wireless radio communication devices which are in range;
    (b) a receiver configured for receiving radio transmissions from other wireless radio communication devices;
    (c) a computer processor coupled to said transmitter and said receiver for controlling communications between itself and other wireless radio communication devices;
    (d) a non-transitory computer-readable memory storing instructions executable by the computer processor;
    (e) wherein said instructions, when executed by the computer processor, perform steps comprising:
        (i) commencing a sector level sweep (SLS) process in which beamforming training is performed as transmitter sector sweep (TXSS) training, in which a sector sweep (SSW) is transmitted, followed by generating sector sweep (SSW) feedback for receipt by the other wireless radio communication devices;
        (ii) wherein prior to or during said sector level sweep (SLS) process polling information is communicated to other stations, wherein said polling information contains scheduling information as to when other stations are to respond to prevent communication collisions;
        (iii) receiving sector sweep frames from the other wireless radio communication devices;
        (iv) combining and delaying said sector sweep (SSW) feedback until a period for sending sector sweep (SSW) feedback signals which contain aggregating best sector contents about multiple stations; and
        (v) receiving sector sweep feedback information, incorporating optimum transmit sector information, from the other wireless radio communication devices at a time according to the scheduling information sent.

2. The apparatus as recited in claim 1, further comprising executing said instructions for learning transmitter sector sweep (TXSS) training results from the other wireless radio communication devices.

3. The apparatus as recited in claim 1, wherein said wireless radio communication apparatus comprises an access point (AP), or a station (STA).

4. The apparatus as recited in claim 1, wherein said transmitter sector sweep (TXSS) training as initiated by said computer processor when that station is a master station within a plurality of wireless radio communication devices.

5. The apparatus as recited in claim 1, wherein said transmitter sector sweep (TXSS) training is initiated in response to receiving an initiator TXSS from a master station within a plurality of wireless radio communication devices.

6. The apparatus as recited in claim 1, further comprising executing instructions for controlling sleep and awake cycling of said wireless radio communication apparatus for a transmitter sector sweep (TXSS) power saving mode.

7. The apparatus as recited in claim 1, further comprising executing instructions for delaying said generating of sector sweep (SSW) feedback, until all sector sweeping transmissions have been performed.

8. The apparatus as recited in claim 1, wherein stations do not send their aggregated sector sweep (SSW) feedback until after all stations have performed their TXSS, with an initiator station being first to send its aggregated SSW feedback, followed by other stations transmitting their respective aggregated SSW feedback.

9. The apparatus as recited in claim 1, wherein said instructions execute generating of sector sweep (SSW) feedback by using a medium access control (MAC) broadcast and a physical layer (PHY) quasi-omni direction mode.

10. The apparatus as recited in claim 1, further comprising executing instructions for an embedded polling and feedback mode in which said polling information is contained in sector sweep (SSW) frames sent by an initiator, while SSW frames from each responder station carries feedback about best sector for a link with the initiator or other stations whose SSW frames have been transmitted, then the SSW feedback is transmitted with the best array sector according to the information carried in the SSW frames of the other wireless radio communication devices.

11. The apparatus as recited in claim 1, wherein said transmitter and receiver operate at millimeter-wave (mm-Wave) radio frequencies.

12. The apparatus as recited in claim 1, wherein said wireless radio communication device and the other wireless radio communication devices form a wireless local area network (WLAN).

13. A wireless radio communication apparatus providing directional transmission between multiple wireless radio communication devices, comprising:
(a) a transmitter configured for generating directional radio transmissions to other wireless radio communication devices which are in range;
(b) a receiver configured for receiving radio transmissions from other wireless radio communication devices;
(c) a computer processor coupled to said transmitter and said receiver for controlling communications between itself and other wireless radio communication devices;
(d) a non-transitory computer-readable memory storing instructions executable by the computer processor;
(e) wherein said instructions, when executed by the computer processor, perform steps comprising:
(i) commencing a sector level sweep (SLS) process in which beamforming training is performed as transmitter sector sweep (TXSS) training, in which a sector sweep (SSW) is transmitted, followed by generating sector sweep (SSW) feedback for receipt by the other wireless radio communication devices;
(ii) wherein prior to or during said sector level sweep (SLS) process polling information is communicated to other stations, wherein said polling information contains scheduling information as to when other stations are to respond to prevent communication collisions;
(iii) receiving sector sweep frames from the other wireless radio communication devices;
(iii) receiving sector sweep feedback information from the other wireless radio communication devices;
(iv) combining and delaying said sector sweep (SSW) feedback until a period for sending sector sweep (SSW) feedback signals which contain aggregating best sector contents about multiple stations;
(v) receiving sector sweep feedback information, incorporating optimum transmit sector information, from the other wireless radio communication devices at a time according to the scheduling information sent; and
(vi) exchanging optimum transmit sector information among wireless radio communication devices that are not initiating sector level sweep (SLS) process because every STA receives the sector sweep (SSW) frames of other stations and utilizes this for mutual transmitter sector sweep (TXSS) training, whereby nearby wireless radio communication devices mutually learn best sector information.

14. The apparatus as recited in claim 13, wherein said wireless radio communication apparatus comprises an access point (AP), or a station (STA).

15. The apparatus as recited in claim 13, wherein said transmitter sector sweep (TXSS) training as initiated by said computer processor when that station is a master station within a plurality of wireless radio communication devices.

16. The apparatus as recited in claim 13, wherein said transmitter sector sweep (TXSS) training as initiated in response to receiving an initiator TXSS from a master station within a plurality of wireless radio communication devices.

17. The apparatus as recited in claim 13, further comprising executing instructions for controlling sleep and awake cycling of said wireless radio communication apparatus for a transmitter sector sweep (TXSS) power saving mode.

18. The apparatus as recited in claim 13, further comprising executing instructions for delaying said generating of sector sweep (SSW) feedback, until all sector sweeping transmissions have been performed.

19. The apparatus as recited in claim 1, wherein said polling information is communicated by transmitting a polling frame in either an omni-directional transmission, or transmitted within sector sweep (SSVV) frames.

20. The apparatus as recited in claim 1, wherein said sector sweep (SSW) feedback information is received from omni-directional transmissions, or is received within the sector sweep (SSW) frames, or is received separately in a beamformed manner.

21. The apparatus as recited in claim 13, wherein said polling information is communicated by transmitting a polling frame in either an omni-directional transmission, or transmitted within sector sweep (SSVV) frames.

22. The apparatus as recited in claim 13, wherein said sector sweep (SSW) feedback information is received from omni-directional transmissions, or is received within the sector sweep (SSW) frames, or is received separately in a beamformed manner.

* * * * *